United States Patent
Kirn et al.

[15] 3,686,957
[45] Aug. 29, 1972

[54] CHANGE SPEED TRANSMISSION WITH SHIFTABLE SHAFT

[72] Inventors: Manfred Kirn, Stuttgart-Moehringen; Alfred Hettich, Stuttgart-Echterdingen; Reinhard Hahner, Stuttgart; Reinhold Stroezel, Leinfelden; Max Burklin, Waldenbuch, all of Germany

[73] Assignee: Robert Bosch GmbH, Stuttgart, Germany

[22] Filed: Nov. 6, 1970

[21] Appl. No.: 87,458

[30] Foreign Application Priority Data

Nov. 14, 1969    Germany..........P 19 57 234.0

[52] U.S. Cl. ............................................... 74/371
[51] Int. Cl. ............................................. F16h 3/08
[58] Field of Search ..................................... 74/371

[56] References Cited

UNITED STATES PATENTS

| | | |
|---|---|---|
| 1,422,072 | 7/1922 | Amundson ..................74/371 |
| 2,683,377 | 7/1954 | Schmid ........................74/371 |
| 799,131 | 9/1905 | Woodruff ....................74/371 |
| 887,410 | 5/1908 | Mathews .....................74/371 |
| 1,390,262 | 9/1921 | Anderson ....................74/371 |
| 1,542,403 | 6/1925 | Miles ...........................74/371 |
| 1,985,016 | 12/1934 | Bush ............................74/371 |
| 2,861,461 | 11/1958 | Kreidler ......................74/371 |
| 3,396,593 | 8/1968 | Moores, Jr ..................74/371 |

*Primary Examiner*—C. J. Husar
*Attorney*—Michael S. Striker

[57] ABSTRACT

The change speed transmission of a portable tool has a shaft carrying in radial or diametrical bores, spring-loaded coupling balls which, in two axially shifted positions of the shaft, project into inner recesses of one or the other of two drive gears rotating at different speeds on the shaft. The speed of the shaft can be selected by manually shifting the shaft in axial direction.

8 Claims, 3 Drawing Figures

Patented Aug. 29, 1972

INVENTORS
Manfred KIRN
Alfred HETTICH
Reinhard HAHNER
Reinhold STROEZEL
Max BÜRKLIN

BY their ATTORNEY

INVENTORS
Manfred KIRN
Alfred HETTICH
Reinhard HAHNER
Reinhold STROEZEL
Max BÜRKLIN

BY their ATTORNEY

CHANGE SPEED TRANSMISSION WITH SHIFTABLE SHAFT

BACKGROUND OF THE INVENTION

The present invention is concerned with a speed change transmission which is particularly suited for driving the tool holder shaft of a drilling machine which is driven by a motor. In known machines of this type, gears are rotatably mounted on a hollow transmission shaft in which a control slide is guided. The control slide rotates with the shaft, but can be shifted in longitudinal direction for placing a coupling member in inner recesses of one or another of two drive gears which rotate at different speeds so that, depending on with which drive gear the shaft is coupled, the shaft rotates at different speeds.

Shiftable transmissions of this type operate reliably, but have the disadvantage that the manufacturing of the hollow shaft, and of the control slide guided in the shaft, is time-consuming, complicated, and expensive. Furthermore, a transmission of the known type has the disadvantage that it can be shifted only during standstill of the machine when the coupled parts are in a particular position relative to each other, into which they have to be turned by a manual operation. Transmissions of this type cannot be shifted under a load.

SUMMARY OF THE INVENTION

It is one object of the invention to provide a change speed transmission which can be inexpensively manufactured, and is suitable for use in the housing of a portable tool, such as a drilling machine.

Another object of the invention is to provide a change speed transmission which can be shifted in any position of the transmission shaft and gears.

Another object of the invention is to provide a change speed transmission which can be shifted under load.

With these objects in view, a change speed transmission according to the invention has a transmission shaft which can be shifted between two axially displaced positions for shifting a coupling means moving therewith between two coupling positions engaging one of a plurality of drive gears which run on the transmission shaft at different speeds.

The function of the shiftable coupling slide of the prior art is transferred to the transmission shaft, so that the same need not be constructed as a hollow shaft, and a shifting slide in the same is not required.

One embodiment of the invention comprises a transmission shaft mounted for rotation and axial movement between first and second shaft positions; drive means including at least first and second gears rotating at different speeds, the gears having inner annular portions, preferably with inner projections and recesses, and being mounted on the transmission shaft with the inner annular portions in sliding contact with the same; and coupling means mounted on the transmission shaft movable with the same between the first and second shaft positions to assume first and second coupling positions engaging the inner annular portions of the first and second gears, respectively, for coupling the first and second gears with the transmission shaft for rotation therewith in the first and second shaft positions respectively. In this manner, the transmission shaft rotates at different speeds in the first and second shaft positions to which it can be shifted by suitable means engaging, for example, an annular groove in the transmission shaft.

The drive gears have inner projections whose extremities slide on the peripheral surface of the transmission shaft. In one embodiment of the invention, a coupling pin is secured in a transverse bore of the shaft, and has end portions projecting from the same into two diametrical recesses of one of the gears. In this embodiment, the inner recesses of the drive gears may be deeper than the projecting portions of the coupling means. This embodiment of the invention already provides a far simpler construction than the prior art, and can be inexpensively manufactured.

Another embodiment of the invention permits the shifting of the transmission in any position at a standstill, and also rotating under a load. In this embodiment, the transmission shaft has a transverse or radial bore in which a spring and coupling balls are located so that the coupling ball is urged by the spring to a position partly located in an inner recess of one of the drive gears. The shape of the inner projections and recesses of the drive gears must correspond to the diameter of the coupling ball, and the depth of the inner recesses must be selected so that the outer portion of the coupling ball is located in the respective inner recess, while the inner portion of the coupling ball is located in the transverse bore whereby the coupling ball is capable of transmitting the torque from the respective drive gear to the transmission shaft but yields when an overload acts on the shaft.

The shifting of the transmission is facilitated when the axial adjacent ends of the inner projections of the drive gears are provided with slanted guide faces which press a coupling ball, which cannot immediately enter an inner recess, against the action of the spring into the bore in the shaft until the spring can push the coupling ball into a passing inner recess.

The shape of the inner recesses in a plane perpendicular to the axis of the transmission shaft, can be selected in such a manner that the coupling has the effect of a slip clutch which permits rotation of the operative drive gears while the transmission shaft is blocked due to an overload.

The safe transmission of torque and the reliability of the transmission are further improved if two coupling balls are provided which are biassed by a common spring in a diametrically arranged bore of the transmission shaft, or when three or more radial bores are provided, each of which contains a spring and a coupling ball.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
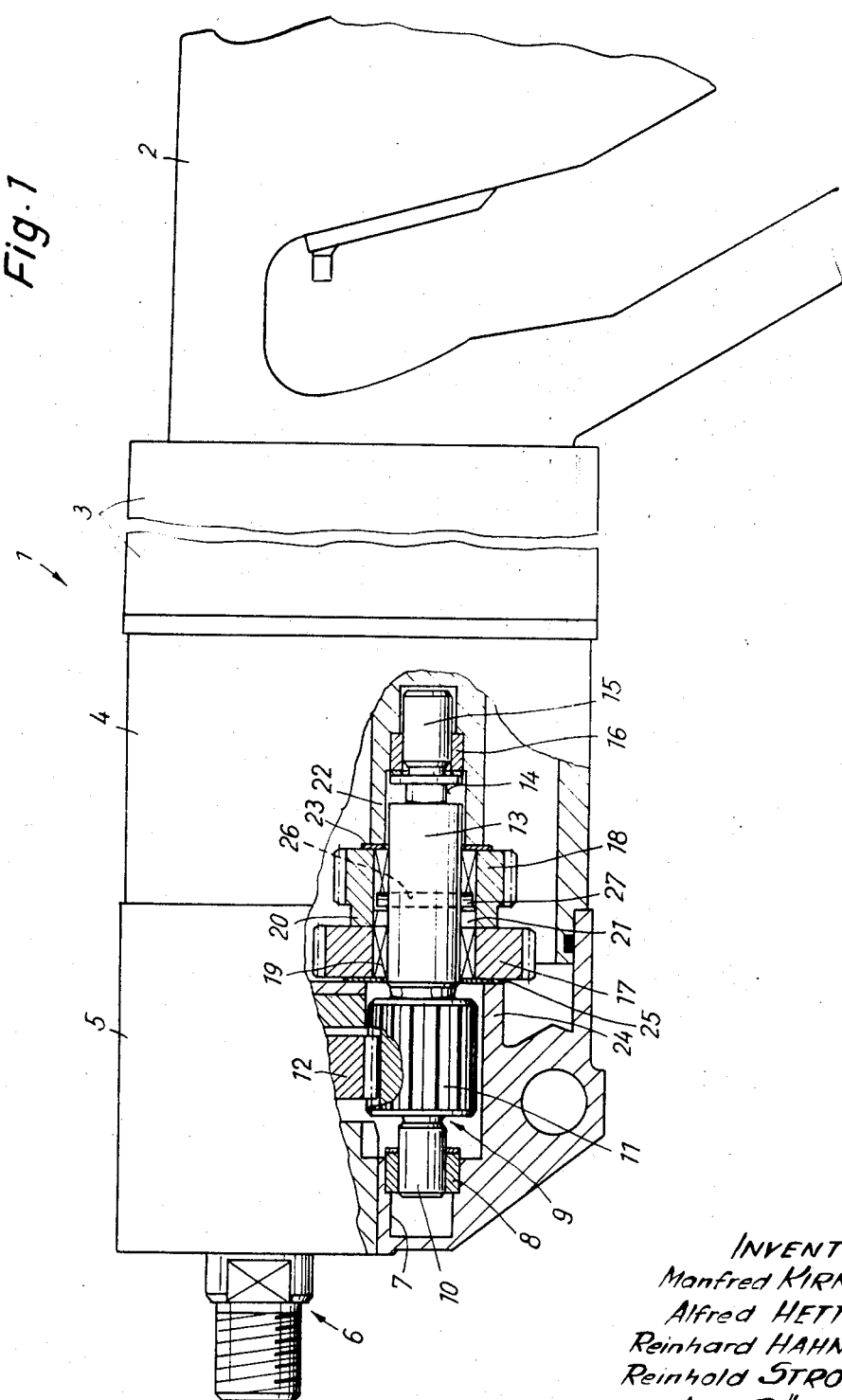
FIG. 1 is a side elevation, partially in section, illustrating a portable drilling machine provided with a transmission according to one embodiment of the invention.

Referring first to the embodiment of FIG. 1, an electric percussion drilling machine has a handle 2 secured to a motor housing 3 in which an electric motor, not shown, is mounted. Forwardly of motor housing 3, a transmission housing 4 is arranged which carries a housing 5 in which apparatus for axially reciprocating the tool holder shaft 6 is located. Tool holder shaft 6 fixedly carries a gear 12, only partly shown in FIG. 1, which meshes with a long gear 11 forming a portion of the transmission shaft 9.

The housing 5 has a sleeve shaped portion 7 supporting a bearing bushing 8 which is spaced from the front wall of housing 5. Transmission shaft 9 is mounted in bearing bushing 8 for rotation, and also for axial movement, and has a first end portion 10 located in the bearing bushing 8, and another end portion 15 located in a bearing 16 carried by a supporting portion 22 of housing 4. A shaft portion 13 is provided on transmission shaft 9 between gear 11 and shaft end portion 15, and is formed with an annular recess 14. Two drive gears 17 and 18 surround the cylindrical shaft portion 13, and have inner annular portions formed of inner projections and recesses 19. The inner projections 19 have inner extremities located on a circle and slidably engaging the outer peripheral surface of the cylindrical portion 13 of transmission shaft 9. The two gears 17 and 18 are part of drive means which further include a motor shaft and intermediate transmission gears meshing with gears 17 and 18 for rotating the same at different speeds. Gear 18 has a hub 20 whose forward end face abuts the lateral face of gear 17. The inner projections 19 in the region of the hub 20 adjacent gear 17 are omitted so that an annular inner recess 21 is formed.

A steel disc 23 abuts the tubular housing portion 22 and one side of gear 18, and a steel disc 25 abuts the front side of gear 17 and also a fixed housing portion 24 so that gears 17 and 18 cannot move in axial direction when shaft 9 is displaced in axial direction.

In the region of gears 17 and 18, the cylindrical shaft portion 13 is provided with a transverse bore 26 which diametrically crosses shaft 9 and portion 13. A coupling means in the form of a pin 27 is secured to bore 26 in a position in which its end portions project on both sides from the peripheral surface of the cylindrical shaft portion 13.

FIG. 1 illustrates transmission shaft 9 in the axial position displaced farthest to the right as viewed in FIG. 1, so that the end portions of coupling pin 27 are located in two diametrical inner recesses 19 of drive gear 18 which rotates at a given speed so that transmission shaft 9 rotates at the same speed while in this axial position, and transmits rotary motion through gears 11, 12 to the tool holder shaft 6. In this position, shaft 9, and consequently also tool holder shaft 6, rotate at a high speed.

When a shifting member, not shown, engaging the annular groove 14 in transmission shaft 9 is forwardly shifted, transmission shaft 9 is also forwardly shifted to a position, not shown, in which the outwardly projecting end portions of coupling pin 27 are located in diametrical inner recesses 19 of the larger drive gear 17. Since the coupling between drive gear 18 and transmission shaft 9 is thus disengaged, and transmission shaft 9 is coupled with the larger drive gear 17, transmission shaft 9, and thereby tool holder shaft 6, rotate at a lower speed.

In an intermediate position of transmission shaft 9, and of coupling pin 27, the outer projecting end portions of coupling pin 27 are located in the region of the inner annular recess 27, where no coupling projections are provided in gear 18, so that both gears rotate freely at different speeds without being coupled with transmission shaft 9 whereby the tool holder shaft is not driven.

Figure 2:
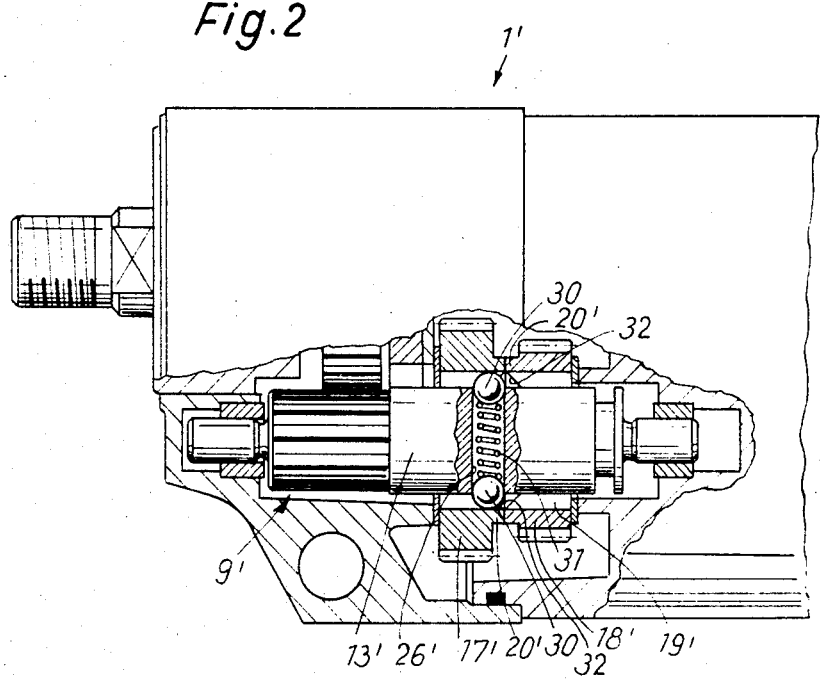
FIG. 2 is a fragmentary side elevation, partially in section, illustrating another embodiment of the invention.

FIG. 2 illustrates another embodiment of the invention in which most parts are the same as described with reference to FIG. 1, with the exception of the construction of the coupling means.

The percussion drilling machine 1' has a transmission shaft 9' with a cylindrical shaft portion 13' in which the diametrical bore 26' contains, instead of a coupling pin, a spring 31 at whose ends two spherical balls 30 are located, and are urged apart by a spring 31.

Drive gears 17' and 18', rotating at different speeds, have inner projections and recesses 19', and the inner extremities of the inner projection are slidably mounted on the cylindrical peripheral surface of shaft portion 13'. Both gears 17' and 18' have adjacent abutting hub portions 20'. The adjacent ends of the inner projections 19 are provided with guide faces 32 slanted in an axial plane, and forming together an annular inner recess in the hubs 20'.

In an intermediate position of transmission shaft 9', the balls 30 are located in this annular recess, so that no torque is transmitted to transmission shaft 9' by either of the two drive gears 17' and 18'. As described with reference to the embodiment of FIG. 1, the transmission shaft 9' can be shifted between two axial positions in which the balls 30 are located either in an inner recess of drive gear 18', or in an inner recess of drive gear 17'. Since the drive gears rotate at different speeds, transmission shaft 9' is rotated at different speeds in the two axially shifted positions into which it can be placed by a manual operation.

In the event that the transmission is to be shifted while the tool holder shaft and transmission shaft 9' are at a standstill, the slanted guide faces 32 press the coupling balls 30 into the transverse bore 26', if shaft 9 is in such a position that the balls engage the innermost extremities of inner projections 19'. During the following rotation of the respective gear, balls 30 are urged by spring 31 to fall into two diametrical inner recesses. When the transmission is to be shifted under load, the slanted guide surfaces 32 facilitate a rapid shifting of the transmission, since the coupling balls are pressed into the transverse bore 26' and then snap into an inner recess, after encountering the end of a projection 19'.

Figure 3:
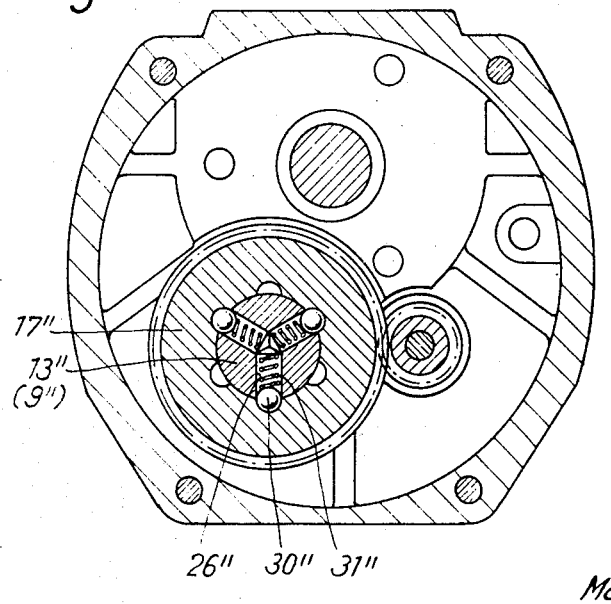
FIG. 3 is a cross-sectional view of a third embodiment.

FIG. 3 illustrates an embodiment which corresponds in every respect to the embodiment of FIG. 2, but instead of the diametrical slot 26' and two coupling balls 30, three angularly spaced radial bores 26'' are provided whose inner ends meet in the center region of portion 13" of transmission shaft 9". Balls 30" are located at the ends of the radial bores 26" and are urged outwardly by the same.

The inner annular portion of each of the two gears, of which only gear 13" is shown in FIG. 3, has inner recesses whose shape corresponds to the shape of coupling balls 30", so that, when the coupling balls 30" snap into the corresponding part cylindrical recesses, the outer half of each coupling ball is located in an inner recess of the respective drive gear, while the inner half is located in the respective radial bore 26". By selecting the depth and shape of the inner recesses, and also by slanting or rounding off inner edges of the same the result can be obtained that, if transmission shaft 9" is jammed due to an overload, the respective coupled drive gear 17" will urge the coupling balls into the radial bores 26", and serve as an overload slip clutch.

The depth of the inner recesses in the drive gears can be selected so that the center of the coupling balls, in either the embodiments of FIGS. 2 and 3, is located in the cylindrical surface of shaft portion 13' or 13", or slightly outwardly of the same.

In any of the illustrated embodiments, a spring can be provided which urges the transmission shaft 9 forward into engagement with a collar on a manually turned sleeve mounted on the housing 5, and provided with an axially effecting cam face acting on the forward end of transmission shaft 9 to urge the same rearward into one coupling position against the action of the above-mentioned spring, while in other turned position of the manually operated sleeve, the spring is effective to shift the transmission shaft 9 to its forward position.

It will be understood that each of the elements described above, or two or more together, may also find a useful application in other types of change speed transmissions for portable tools differing from the types described above.

While the invention has been illustrated and described as embodied in a transmission having a shaft shiftable between two axial positions and carrying coupling means coupled with two drive gears in the two positions of the shaft, respectively, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. Change speed transmission comprising, in combination, supporting means; a transmission shaft mounted on said supporting means for rotation, and also for axial movement between at least first and second shaft positions, said transmission shaft having at least one radial bore; drive means including first and second gears rotating at different speeds, and having first and second inner circular surfaces, respectively, in sliding contact with said transmission shaft, said inner circular surfaces being formed with at least one first and second recess, respectively; and coupling means including a spring in said radial bore, and at least one coupling ball located in said bore outward of said spring, and biassed by said spring to abut said first and second inner circular surfaces in said first and second shaft positions, respectively, and to move to first and second coupling positions located in said first and second recesses, respectively, for coupling said first and second gears, respectively, with said transmission shaft in said first and second shaft positions, respectively, the depth and contour of said first and second recesses and diameter of said bore matching the radius and contour of said coupling ball so that in said first and second coupling positions, an outer ball portion is located in one of said first and second recesses and an inner ball portion is located in said bore whereby said coupling ball connects said transmission shaft with the respective gear for rotation, but is pressed by the respective inner circular surface completely into said bore against the action of said spring when said transmission shaft is blocked against rotation by an overload torque.

2. Change speed transmission as claimed in claim 1 wherein said first and second gears have inner annular portions forming said first and second inner circular surfaces, respectively, and also forming first and second lateral annular adjacent guide surfaces slanted in an axial plane for guiding said outer portion of said coupling ball into one of said recesses.

3. Change speed transmission as claimed in claim 1 wherein said transmission shaft has three angularly equally spaced radial bores; wherein said first and second inner circular surfaces have three angularly equally spaced recesses, respectively; wherein said coupling means include three springs in said bores, respectively, and three coupling balls located in said bores outward of said springs and urged by the same to enter said three recesses.

4. Change speed transmission as claimed in claim 1 wherein the center of said coupling ball in each of said coupling positions is located in the outer peripheral surface of said transmission shaft.

5. Change speed transmission as claimed in each of claim 1 wherein the center of said coupling ball in said coupling positions is located radially outwardly of the outer peripheral surface of said transmission shaft.

6. Change speed transmission as claimed in claim 1 wherein said bore diametrically penetrates said transmission shaft; and wherein a coupling ball is located at each end of said spring so that said coupling balls are simultaneously urged by the same into two diametrical inner recesses of the respective gear of said first and second gears.

7. Change speed transmission as claimed in claim 1 wherein said shaft has a plurality of angularly equally spaced radial bores; and wherein said coupling means include a plurality of springs located in the inner portions of said bores, and a plurality of coupling balls located in said bores outward of said springs, respectively, and urged by the same into a plurality of angularly spaced inner recesses of the respective gear of said first and second gears.

8. Change speed transmission as claimed in claim 1 wherein said transmission shaft has an annular peripheral groove adapted to be engaged during rotation by a manually operated means for shifting said transmission shaft between said first and second shaft positions.

* * * * *